(12) United States Patent
Hasegawa

(10) Patent No.: US 10,994,762 B2
(45) Date of Patent: May 4, 2021

(54) HEAVY DUTY CARRIAGE

(71) Applicant: Mitsuo Hasegawa, Kitakatsuragi-gun (JP)

(72) Inventor: Mitsuo Hasegawa, Kitakatsuragi-gun (JP)

(*) Notice: Subject to any disclaimer, the term of this patent is extended or adjusted under 35 U.S.C. 154(b) by 0 days.

(21) Appl. No.: 16/976,723

(22) PCT Filed: Jan. 10, 2020

(86) PCT No.: PCT/JP2020/000548
§ 371 (c)(1),
(2) Date: Aug. 28, 2020

(87) PCT Pub. No.: WO2021/005814
PCT Pub. Date: Jan. 14, 2021

(65) Prior Publication Data
US 2021/0009181 A1    Jan. 14, 2021

(30) Foreign Application Priority Data
Jul. 10, 2019 (JP) ................. 2019-128683

(51) Int. Cl.
*B62B 3/10*       (2006.01)
*B60B 33/00*      (2006.01)
(Continued)

(52) U.S. Cl.
CPC ............ *B62B 3/10* (2013.01); *B60B 33/0044* (2013.01); *B65G 7/04* (2013.01); *B62B 5/0086* (2013.01)

(58) Field of Classification Search
CPC ..... B62B 3/10; B62B 5/0086; B60B 33/0044; B65G 7/04
See application file for complete search history.

(56) References Cited

U.S. PATENT DOCUMENTS 2,834,605 A * 5/1958 McCollough ............ B62D 7/02
180/410
4,335,626 A * 6/1982 Fisher .................... B62D 7/026
280/91.1
(Continued)

FOREIGN PATENT DOCUMENTS

JP          62182804 U     11/1987
JP           3051835 U      9/1998
(Continued)

*Primary Examiner* — Saul Rodriguez
*Assistant Examiner* — Ashley K Romano
(74) *Attorney, Agent, or Firm* — Alleman Hall Creasman & Tuttle LLP (57) ABSTRACT

A heavy duty carriage includes a carriage body, a load receiving platform horizontally rotatably mounted on a top of the carriage body, and a plurality of caster bodies each horizontally rotatably supported by a caster shaft in a lower part of the carriage body. Each of the caster bodies has, in a lower part thereof, a front wheel rotatably supported by a front wheel shaft and rear wheels each rotatably supported by a rear wheel shaft. The front wheel and the rear wheels are positioned forward and rearward of an axial center of the caster shaft on a straight line in a horizontal direction. When the carriage body is placed on a floor surface and outer circumferences of the rear wheels contact the floor surface, an outer circumference of the front wheel does not contact the floor surface. By using four heavy duty carriages, the heavy object can be moved.

3 Claims, 12 Drawing Sheets

(51) Int. Cl.
B65G 7/04 (2006.01)
B62B 5/00 (2006.01)

(56) References Cited

U.S. PATENT DOCUMENTS

| | | | | |
|---|---|---|---|---|
| 5,163,189 | A * | 11/1992 | DeGray | A61G 7/1015 |
| | | | | 180/19.2 |
| 5,403,023 | A * | 4/1995 | Tsai | A45C 13/385 |
| | | | | 280/42 |
| 5,964,471 | A * | 10/1999 | Copland | B62B 3/001 |
| | | | | 180/408 |
| 6,135,465 | A * | 10/2000 | Chapman | B62D 7/02 |
| | | | | 280/103 |
| 6,874,800 | B2 * | 4/2005 | George | A61G 7/00 |
| | | | | 180/19.1 |
| 8,312,957 | B1 * | 11/2012 | Stoltzfus | E04G 21/0418 |
| | | | | 180/411 |
| 8,709,814 | B2 * | 4/2014 | Ammann | B01L 7/5255 |
| | | | | 436/43 |
| 8,911,332 | B2 * | 12/2014 | Kraus | A63B 22/20 |
| | | | | 482/52 |
| 2003/0136297 | A1 * | 7/2003 | Holtz | B65G 7/04 |
| | | | | 104/172.1 |
| 2007/0267278 | A1 * | 11/2007 | Reist | F16H 19/06 |
| | | | | 198/852 |
| 2016/0167430 | A1 * | 6/2016 | Boyl-Davis | B60B 33/0044 |
| | | | | 414/800 |
| 2020/0172137 | A1 * | 6/2020 | Ryan | B65D 11/1833 |
| 2020/0172139 | A1 * | 6/2020 | Bakker | B62B 5/0069 |
| 2020/0189317 | A1 * | 6/2020 | Marshall | B60B 33/0049 |

FOREIGN PATENT DOCUMENTS

| | | |
|---|---|---|
| JP | 2002067601 A | 3/2002 |
| JP | 2003246202 A | 9/2003 |
| JP | 2010143419 A | 7/2010 |
| JP | 2014019195 A | 2/2014 |
| JP | 2015024800 A | 2/2015 |

* cited by examiner

CONVENTIONAL ART

FIG. 22

CONVENTIONAL ART

FIG. 23

CONVENTIONAL ART

FIG. 24

CONVENTIONAL ART

HEAVY DUTY CARRIAGE

TECHNICAL FIELD

The present disclosure relates to a heavy duty carriage used for allowing one person to move a heavy object, such as a piece of furniture, to be used in ordinary houses or offices.

BACKGROUND ART

Figure 18:
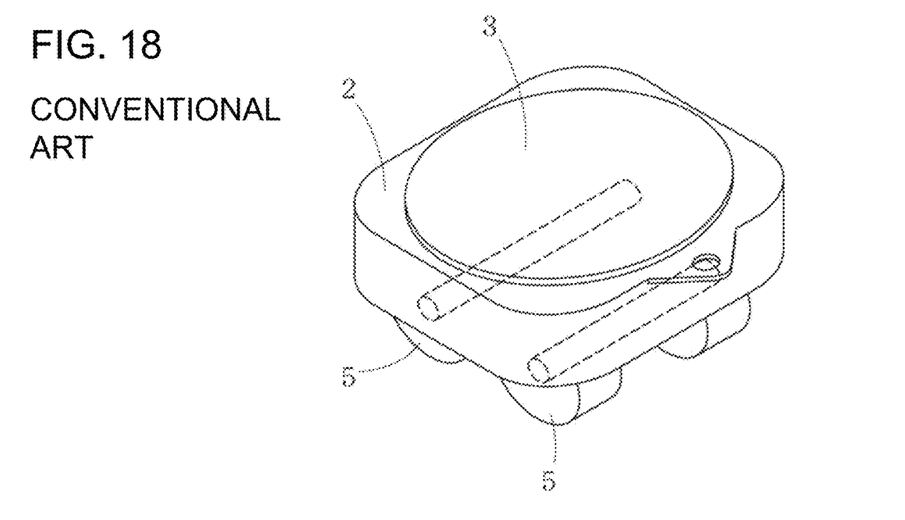
FIG. 18 is a three-dimensional perspective view of a conventional heavy duty carriage 1.
Figure 19:
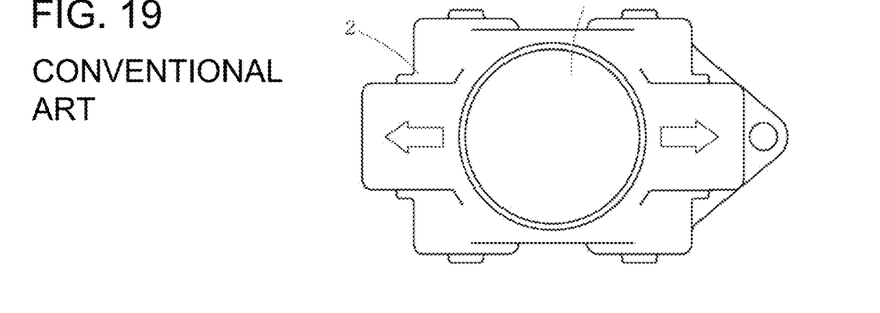
FIG. 19 is a plan view of a conventional heavy duty carriage 2.
Figure 20:
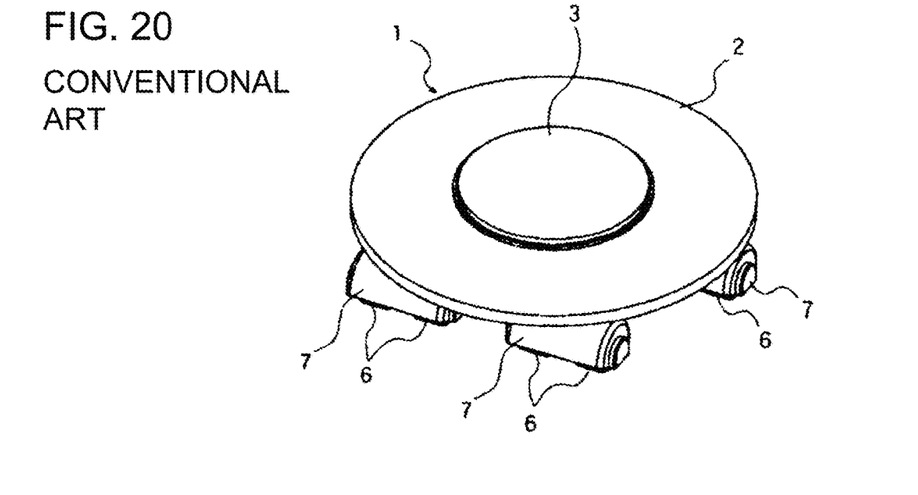
FIG. 20 is a three-dimensional perspective view of a conventional heavy duty carriage 3.
Figure 21:
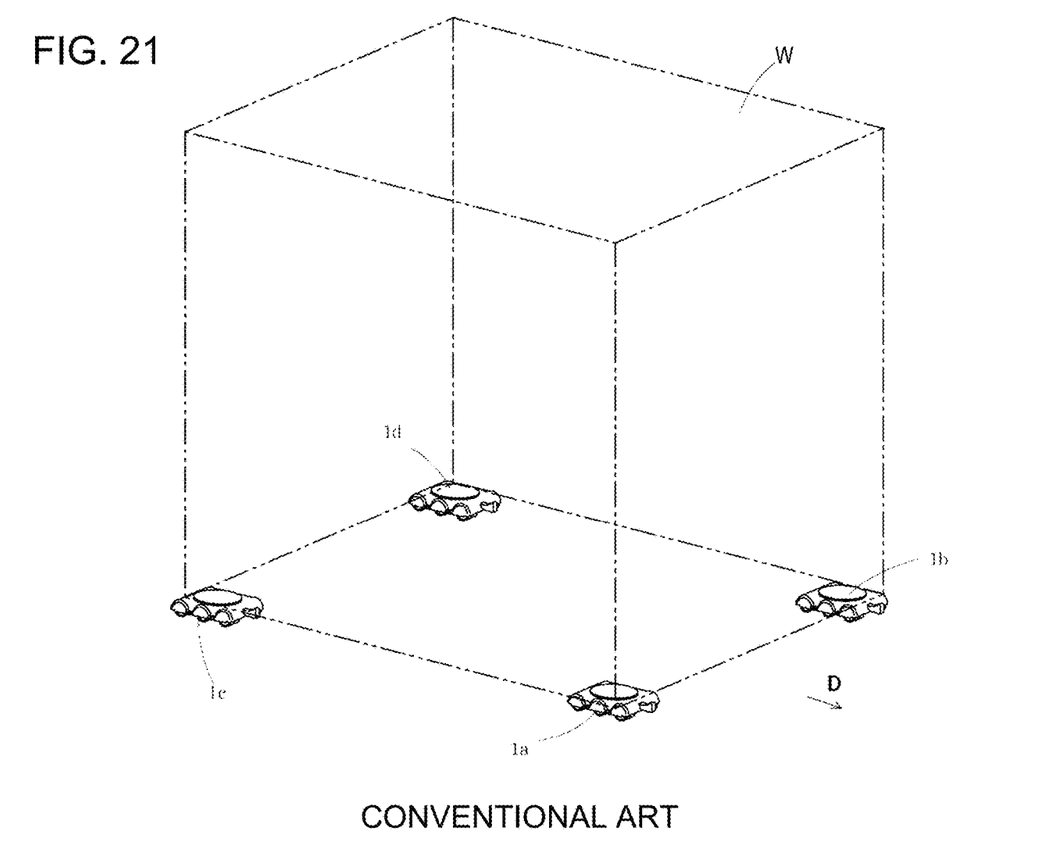
FIG. 21 is a view illustrating usage of the conventional heavy duty carriage 2.
Figure 22:
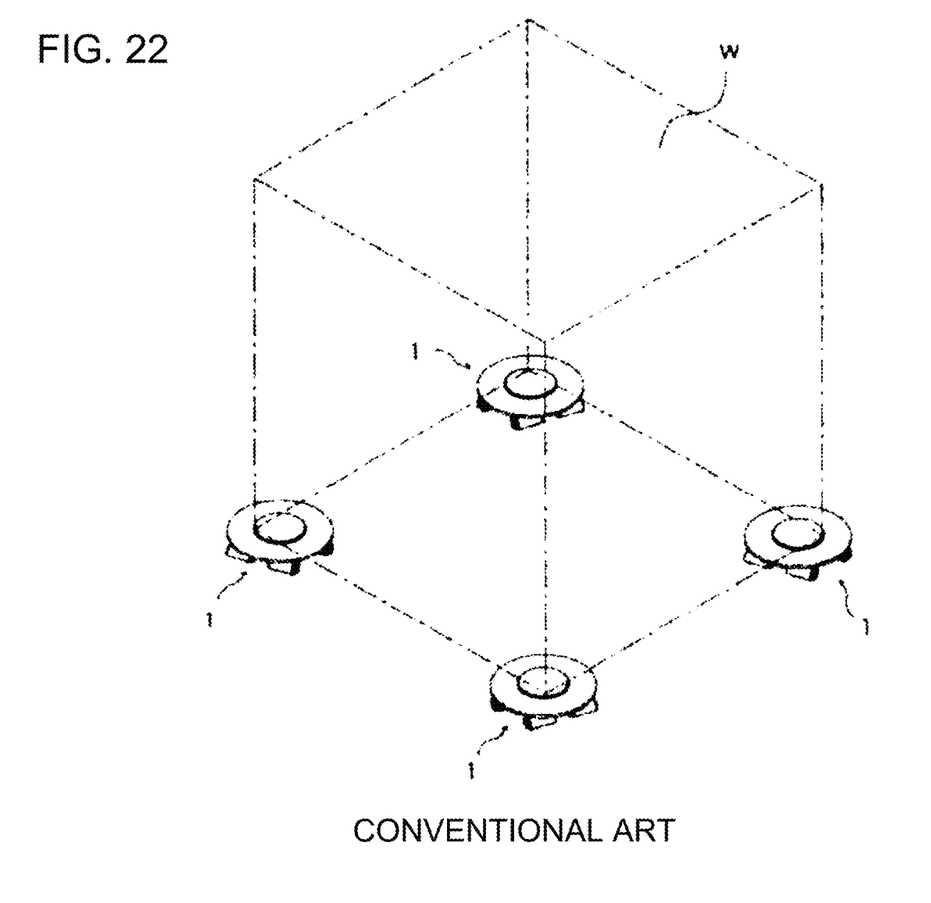
FIG. 22 is a view illustrating usage of the conventional heavy duty carriage 3.

FIGS. 18, 19, and 20 illustrate conventional heavy duty carriages. As illustrated in FIGS. 21 and 22, these heavy duty carriages are used by being placed underneath a heavy object. These conventional arts are similar to those disclosed in Patent Documents 1, 2, and 3, for example. The carriage has a structure in which a load receiving platform is provided on a body and a plurality of rotatably supported rollers are provided in a lower part of the body. At least four such carriages are used by being inserted into four corners underneath a heavy object (e.g., a piece of furniture) so that, while supporting the heavy object, the carriages can integrally move with the heavy object by utilizing the load applied from the heavy object.
Patent Document 1: JP3,051,835U
Patent Document 2: JP2010-143419A
Patent Document 3: JP2015-024800A

DESCRIPTION OF THE DISCLOSURE

Problems to be Solved by the Disclosure

As illustrated in FIG. 21, according to the heavy duty carriages of Patent Documents 1 and 2 described above, by placing heavy duty carriages 1a, 1b, 1c, and 1d at four corners underneath a heavy object W, while supporting the heavy object W, the carriages can be integrated with the heavy object W by utilizing the load applied from the heavy object W so as to move the heavy object W. However, the moving direction is limited along a straight line on which the rollers of the heavy duty carriages rotate.

Moreover, as illustrated in FIG. 22, according to the heavy duty carriage of Patent Document 3, by placing heavy duty carriages 1 at four corners underneath a heavy object W, while supporting the heavy object W, the carriages 1 can be integrated with the heavy object W by utilizing the load applied from the heavy object W so as to move the heavy object W. Although the moving direction is free because casters of this heavy duty carriage rotate, such a carriage involves problems in practical use, as described below.

According to the heavy duty carriage of Patent Document 3, since rollers of all casters move rearward with respect to respective caster shafts when the heavy duty carriage 1 moves, the heavy duty carriage 1 has a risk of being inclined forward due to a disturbance, such as a slight step on a floor in the traveling direction of the carriage. In order to more or less avoid the risk of such a forward inclination, the carriage body has an increased external dimension as compared to the diameter of a load receiving platform and the casters are provided outward of the diameter of the load receiving platform. However, in practical use, since the outer edge of the carriage body is largely protruded from the heavy object W, the carriage has a problem when used close to a wall, etc.

Figure 23:
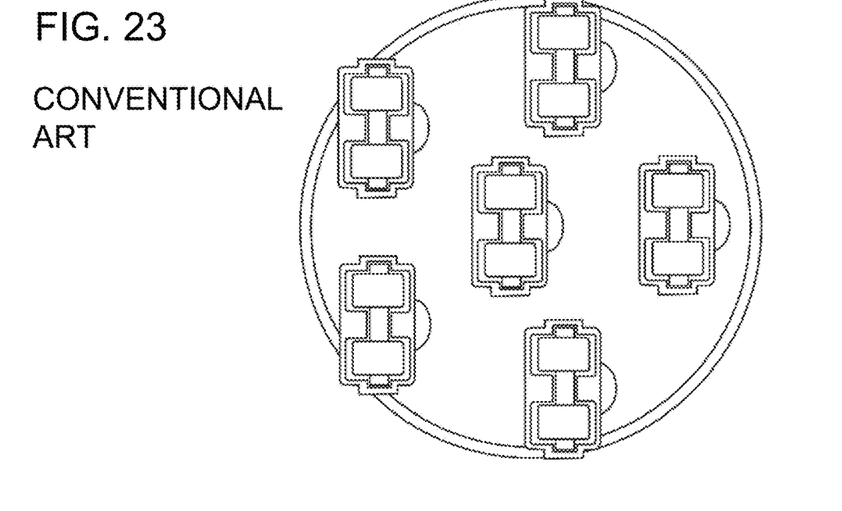
FIG. 23 is a bottom view (#1) of the conventional heavy duty carriage 3.
Figure 24:
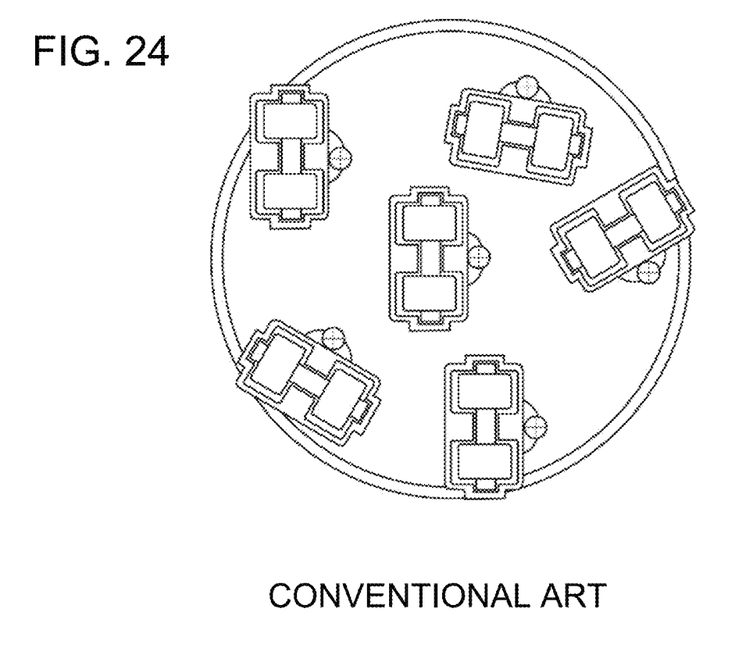
FIG. 24 is a bottom view (#2) of the conventional heavy duty carriage 3.

Further, according to the heavy duty carriage of Patent Document 3, all casters are essentially required to be oriented to the same direction as illustrated in FIG. 23 in order for the heavy duty carriage 1 to move. However, as illustrated in FIG. 24, the casters of the heavy duty carriage 1 before being placed at the four corners underneath the heavy object W are naturally oriented to different directions around the respective caster shafts. Thus, if the carriages are placed in such a state at the four corners underneath the heavy object W, the plurality of casters necessarily rotate in mutually different directions in order to align with the traveling direction of the heavy duty carriage 1. Therefore, the mutual resistance among the casters prevents a smooth start of moving of the carriages. Therefore, it is required to align the orientation of all casters when placing the heavy duty carriages 1 at the four corners underneath the heavy object W.

SUMMARY OF THE DISCLOSURE

A heavy duty carriage according to the present disclosure made in order to solve the above problems, includes a carriage body, a load receiving platform mounted on a top of the carriage body, and a plurality of caster bodies provided in a lower part of the carriage body and each rotatably supported by a caster shaft. The caster shaft is substantially perpendicular to a floor surface when the carriage body is placed on the floor surface. Each of the caster bodies has, in a lower part thereof, a front wheel rotatably supported by a front wheel shaft which is substantially parallel to the floor surface when the carriage body is placed on the floor surface, and rear wheels each rotatably supported by a rear wheel shaft which is substantially parallel to the front wheel shaft, and is provided on one side of the caster body which is opposite from the side where the front wheel is provided, with respect to the caster shaft.

Moreover, according to the present disclosure, when the carriage body is placed on the floor surface and outer circumferences of the rear wheels contact the floor surface, an outer circumference of the front wheel does not contact the floor surface.

Moreover, according to the present disclosure, each of the plurality of caster bodies has, in an outer circumference, a first external gear, and the carriage body has, in a lower part, a second external gear which has a rotational shaft in a substantially perpendicular direction to the floor surface when the carriage body is placed on the floor surface, and has, in an outer circumference, an external gear. The plurality of caster bodies mesh with the second external gear so that the plurality of caster bodies are interlocked with each other to travel in the same direction.

Moreover, according to the present disclosure, each of the plurality of caster bodies has, on a top surface thereof, a sliding surface where the top surface of the caster body and the lower surface of the carriage body slide. When the carriage body is placed on the floor surface and the outer circumferences of the rear wheels contact the floor surface, the contact surfaces of the outer circumferences of the rear wheels are positioned inward of a shape of an outer circumference of the sliding surface projected on the floor surface.

Moreover, according to the present disclosure, the load receiving platform is mounted on the top of the carriage body so as to be rotatable in a horizontal direction.

Moreover, according to the present disclosure, the load receiving platform is made of an elastic material, and has a substantially truncated cone shape with the center part being higher.

According to such a carriage, as illustrated in FIGS. 4 and 6 to 8, a caster body bearing 4b is rotatably fitted onto a caster shaft 5 so that a caster body 4 is rotatable around the caster shaft 5 in a substantially horizontal direction with respect to the floor surface when the carriage body is placed on the floor surface. Moreover, as illustrated in side views of FIGS. 3, 7, and 8, when rear wheels 6 are in contact with the floor, a front wheel 8 does not contact with the floor surface with a gap X therebetween. That is, in the caster body 4, only the rear wheels 6 contact with the floor surface at a deviated position with respect to the caster shaft 5. Thus, when the heavy duty carriage 1 travels, with respect to the traveling direction, the rear wheels 6 are positioned rearward of the caster body bearing 4b and the front wheel 8 is positioned forward of the caster body bearing 4b in each of the caster bodies 4.

Figure 6:
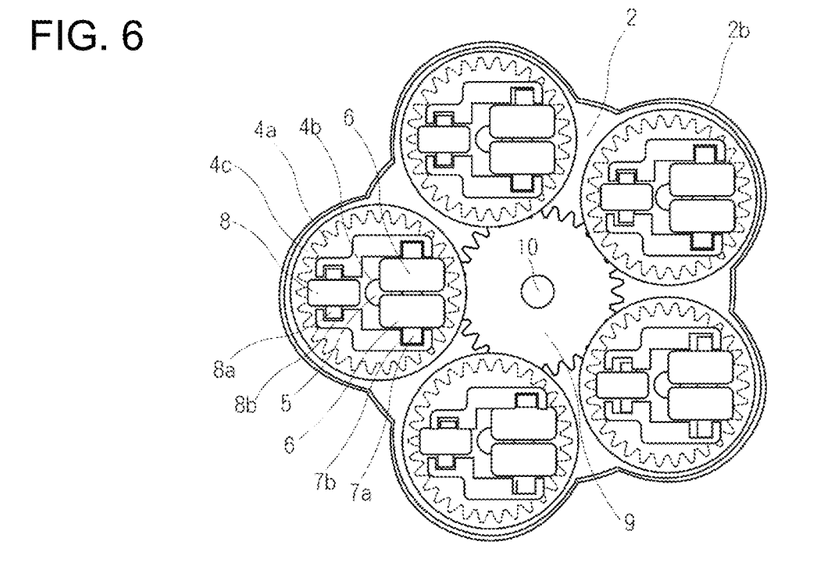
FIG. 6 is an open bottom view illustrating the first embodiment according to the present disclosure.
Figure 8:
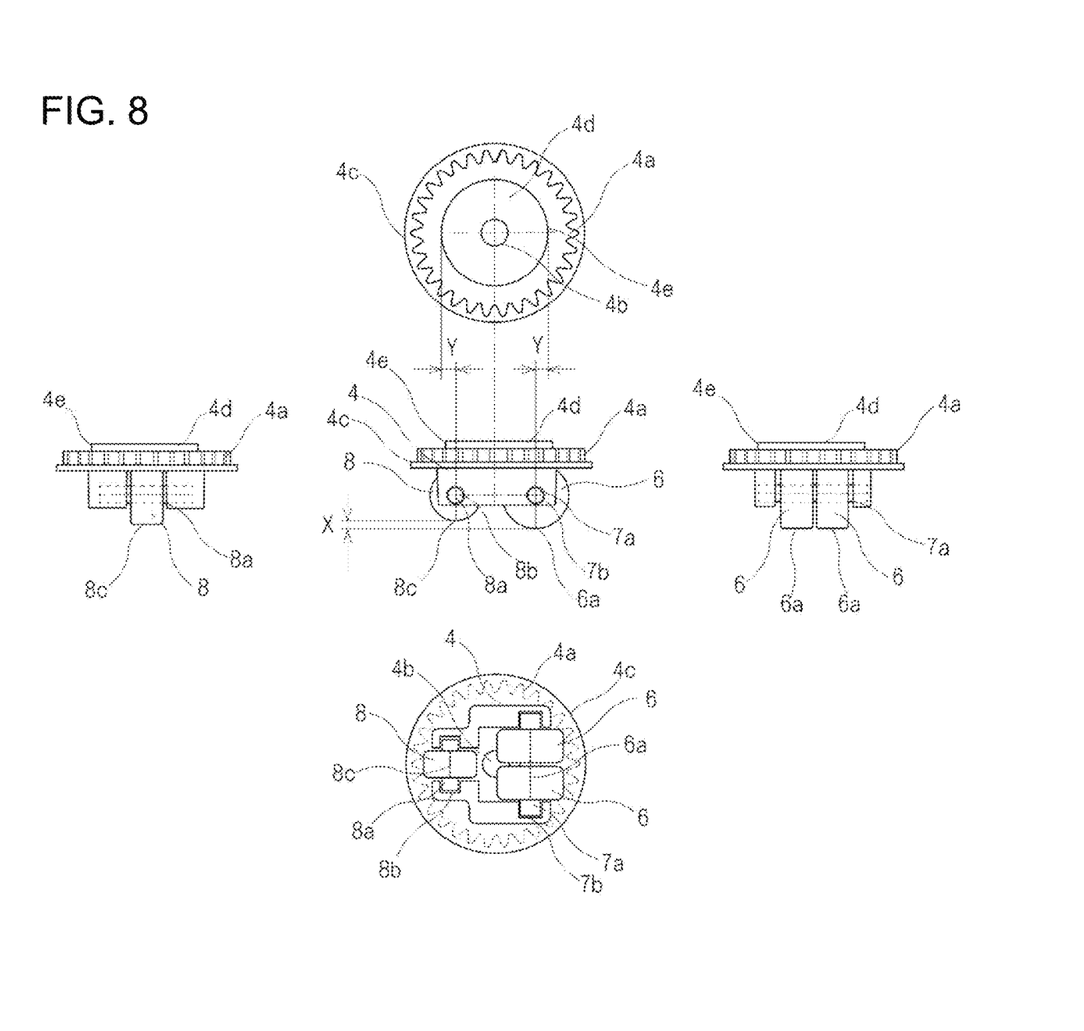
FIG. 8 is a five-sided view of the caster body, illustrating the first embodiment according to the present disclosure.

Moreover, as illustrated in FIGS. 6 and 8, the caster body 4 of the heavy duty carriage 1 has a first external gear 4a in the outer circumference. When the caster body bearing 4b is rotatably fitted onto the caster shaft 5, the first external gear meshes with a second external gear 9 which is horizontally rotatably provided at a substantially center on the lower part of a carriage body 2. Thus, all the caster bodies 4 can be interlocked with each other to travel in the same direction.

Figure 7:
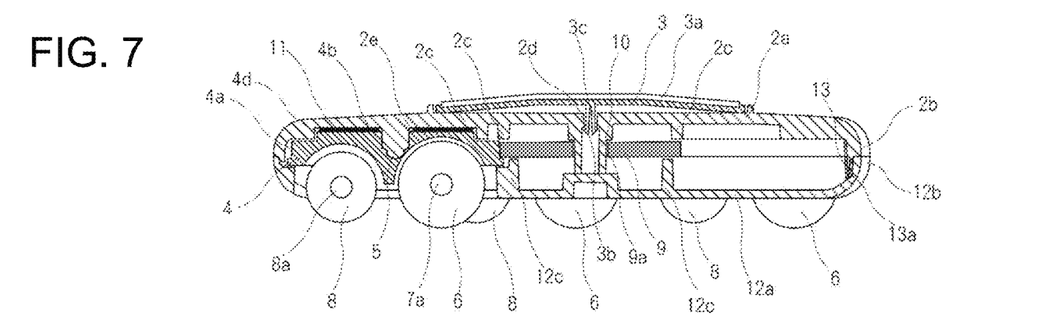
FIG. 7 is a cross-sectional view taken along a line A-A of FIG. 2, illustrating the first embodiment according to the present disclosure.

Moreover, in the caster body 4, although only the rear wheels 6 contact with the floor surface at the deviated position with respect to the caster shaft 5, as illustrated in FIGS. 7 and 8, an outer circumferential edge 4e of a caster body sliding surface 4d is positioned outward of rear wheel contact surfaces 6a of the rear wheels 6. Therefore, the load to be acted on the rear wheels 6 can be directly transmitted from a sliding surface in the lower part of the carriage body.

Moreover, as illustrated in FIG. 7, a load receiving platform 3 is configured so that a load receiving platform shaft 3c is held within a platform shaft hole 2d so as to be rotatable in a horizontal direction. Therefore, a single heavy duty carriage 1 also has a function as a caster.

Figure 1:
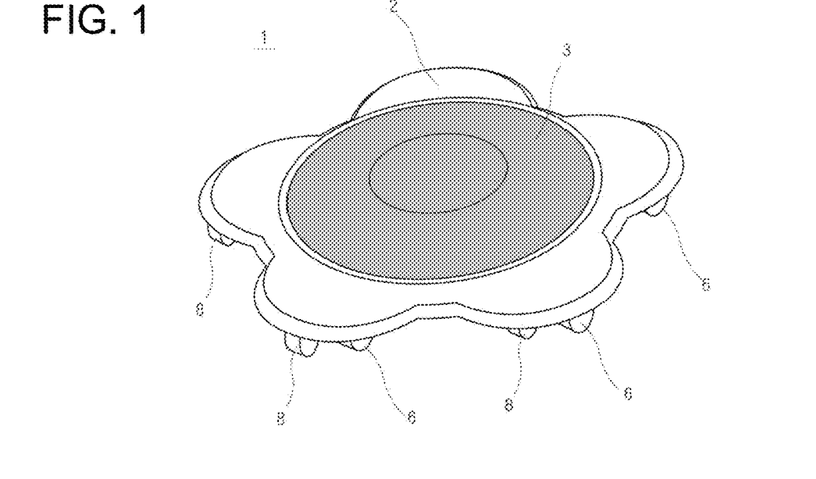
FIG. 1 is a perspective view illustrating a first embodiment according to the present disclosure.
Figure 2:
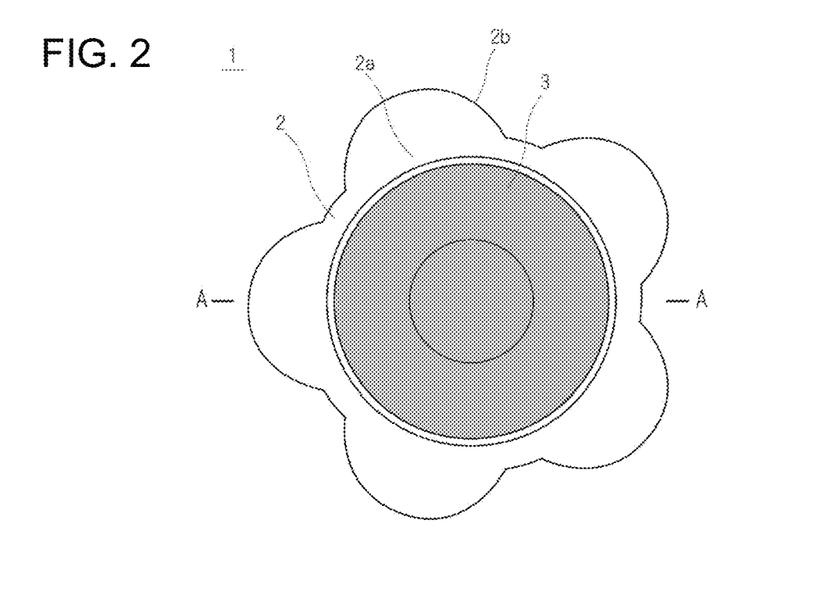
FIG. 2 is a top view illustrating the first embodiment according to the present disclosure.
Figure 3:
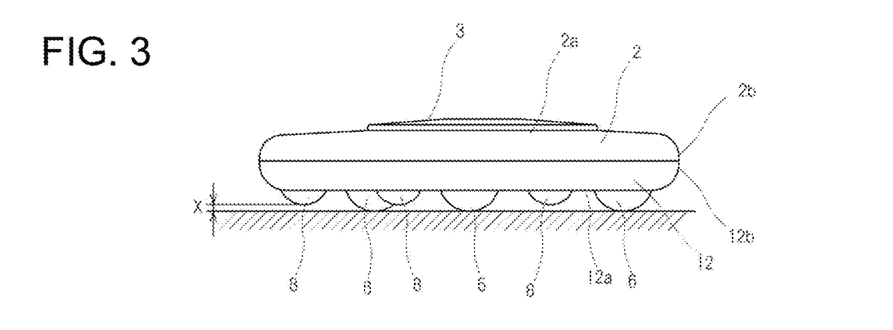
FIG. 3 is a side view illustrating the first embodiment according to the present disclosure.
Figure 4:
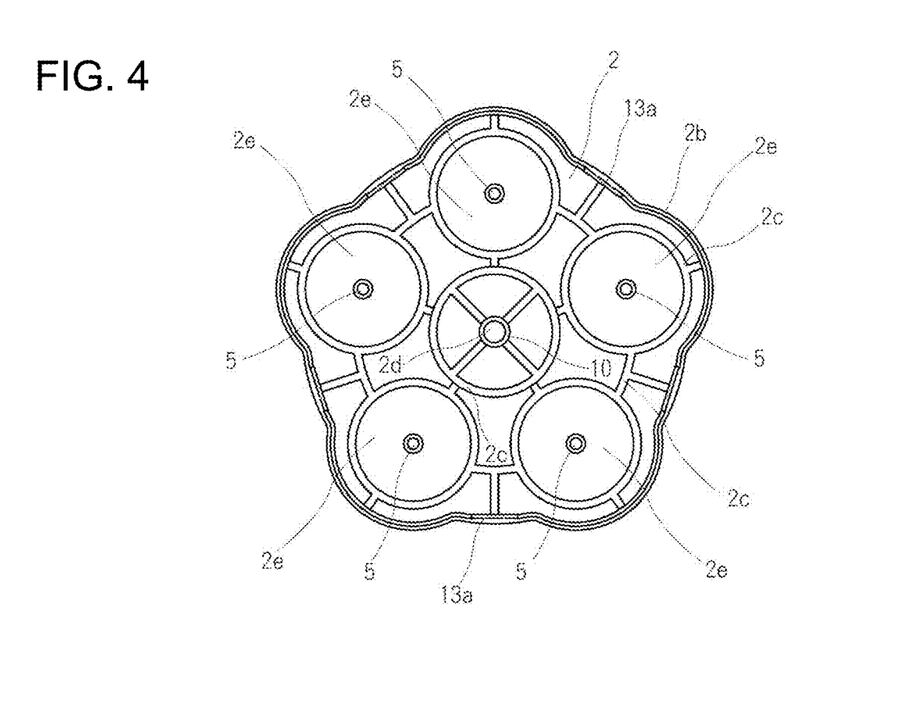
FIG. 4 is a bottom view of a carriage body, illustrating the first embodiment according to the present disclosure.

Moreover, as shown in FIGS. 3 and 7, the load receiving platform 3 is made of an elastic body in a truncated cone shape gently inclining from the outer circumference part toward the center part. Thus, the load receiving platform has a spring characteristic of being stretchable and shrinkable in an up-and-down direction, and has a suspension function.

Effects of the Disclosure

As described above in detail, according to the present disclosure, each of the plurality of caster bodies 4 is horizontally rotatably supported around the caster shaft 5 in the lower part of the carriage body 2, so that the traveling directions of the caster bodies can be changed freely. Thus, unlike a conventional carriage which requires to lift a heavy object (e.g., a piece of furniture) to change the direction of the carriage each time a user changes a traveling direction, the carriage of the present disclosure allows the user to freely change the traveling direction of the carriage with the heavy object (e.g., a piece of furniture) being placed on the carriage. Therefore, the present disclosure has an effect of reducing the burden of the user. Moreover, the first external gear 4a of each of the plurality of caster bodies 4 in the heavy duty carriage 1 according to the present disclosure meshes with the second external gear 9 which is horizontally rotatably supported at the substantially center part of the lower part of the carriage body, so that the plurality of first external gears 4a are interlocked with each other to always travel in the same direction via the second external gear 9. Thus, the resistance among the casters can be eliminated, which conventionally occurs when the carriages are placed at four corners underneath a heavy object W and start to move while the traveling directions of the plurality of caster bodies are oriented to mutually different directions. Therefore, the heavy duty carriage 1 can start moving smoothly, which reduces the burden of the user, and also has an effect of reducing the risk of the carriage coming off the lower surface of the heavy object W (e.g., a piece of furniture).

Moreover, even if the heavy duty carriage 1 is exposed to a disturbance such as a step or a foreign object on a floor surface during traveling, which causes the resistance in the traveling of the rear wheels 6 of the caster bodies 4 located forward of the heavy duty carriage 1 and which causes the heavy duty carriage 1 to incline forward, according to the present disclosure, the front wheel 8 of each caster body 4 of the heavy duty carriage 1 contacts the floor surface so as to hold the load. Therefore, the heavy duty carriage 1 is prevented from being inclined forward and also has an effect of reducing the risk of the carriage coming off the lower surface of the heavy object W (e.g., a piece of furniture).

Moreover, since the outer circumferential edge 4e of the caster body sliding surface 4d of each caster body 4 is positioned outward of a rear wheel contact surfaces 6a of the rear wheels 6, the load to be acted on the rear wheels is directly, not via the caster shaft 5, transmitted from the sliding surface in the lower part of the carriage body. Thus, the caster shaft 5 is prevented from receiving excess load, and the caster parts are integrally molded with an inexpensive resin.

Moreover, even when the heavy duty carriages 1 are placed at the four corners underneath the heavy object W while the traveling directions of some of the carriages 1 are different and the resistance may occur at the start of traveling of the heavy object W, the load receiving platforms 3 of the heavy duty carriages 1 according to the present disclosure can rotate in the horizontal direction, and thus, cause the carriage bodies 2 to move so as to orient to the traveling direction of the heavy object W. Thus, the traveling of the heavy duty carriages 1 can be facilitated.

Moreover, even if one or two of the heavy duty carriages 1 placed at the four corners underneath the heavy object W is/are faced with some differences in height due to a bend, etc. on the floor surface on which the carriage(s) 1 travels, or a situation where the load applied from the heavy object W is lost, since the load receiving platform of the heavy duty carriage 1 according to the present disclosure is made of an elastic material and has the spring effect with a truncated cone shape gently inclining from the outer circumference part toward the center part, the effect in safety is increased, in which the risk such that the carriage is coming off the lower surface of the heavy object W (e.g., a piece of furniture) is reduced by the load receiving platform being stretched and shrunk.

MODES FOR CARRYING OUT THE DISCLOSURE

Embodiments

FIGS. 1 to 8 illustrate a first embodiment of a heavy duty carriage 1 according to the present disclosure. The heavy duty carriage 1 is comprised of a carriage body 2 made of synthetic resin, a load receiving platform 3 made of synthetic resin, caster bodies 4 made of synthetic resin, rear wheels 6 made of synthetic resin, rear wheel shafts 7a made of metal, front wheels 8 made of synthetic resin, rear wheel shafts 8a made of metal, a second external gear 9 made of metal, low-friction resin plates 11, and a bottom cover 12.

As illustrated in FIGS. 1 to 7, the carriage body 2 has a curved external surface which partly covers the front and rear wheels from a top plate 2a to an external surface edge 2b in a disk-like shape, and the carriage body 2 also includes, on a lower surface of the top plate 2a, five caster shafts 5 and five carriage body lower part sliding surfaces 2e, a second external gear shaft 10, reinforcement ribs 2c, a platform shaft hole 2d, and five carriage body locking hook receivers 13. The bottom of the carriage body 2 is opened.

As illustrated in FIG. 8, the caster body 4 is comprised of a sliding surface 4d on the top, a first external gear 4a and a rim 4c in an outer circumference, a caster body bearing 4b in the center, a rear wheel bearing 7b on the rear side of the lower part, and a front wheel bearing 8b on the front side of the lower part, and these components of the caster body 4 are integrally molded with synthetic resin. Moreover, two rear wheels 6 are rotatably supported around the rear wheel shaft 7a via the rear wheel bearing 7b, one front wheel 8 is rotatably supported around a front wheel shaft 8a via the front bearing 8b, and the caster body bearing 4b is rotatably fitted onto the caster shaft 5 so as to sandwich the low-friction resin plate 11.

In this case, the rear wheel 6 has a diameter of 15 mm, and the front wheel 8 has a diameter of 13 mm. A gap X illustrated in FIGS. 3 and 8 is 1 mm. However, each of these numerical values is merely an example, and each parameter may be larger or smaller.

As illustrated in FIGS. 6 and 7, the first external gear 4a of each caster body 4 meshes with the second external gear 9 rotatably supported around the second external gear shaft 10, so that the rotations of all caster bodies 4 are interlocked. In the first embodiment, since five caster bodies 4 are provided, the first external gear 4a and the second external gear 9 have a module of 0.9, and the first external gear 4a has 40 teeth and the second external gear 9 has 35 teeth so that the gears are synchronized. Moreover, the rim 4c of each caster body 4 covers an outer circumference of a lower surface of the second external gear 9, and thus serves to hold the second external gear 9. The number of teeth is optimally selected from different combinations depending on cases, including a case where an increased or decreased number of the caster bodies 4 are provided.

As illustrated in FIGS. 7 and 8, an outer circumferential edge 4e of the sliding surface 4d of the caster body 4 is configured to be outward of rear wheel contact surfaces 6a of the rear wheels 6. As illustrated in the top view and the front view in FIG. 8, the outer radius of the outer circumferential edge 4e of the sliding surface 4d is Y mm larger than the distance from the center of the caster shaft 5 to the rear wheel contact surface 6a, and the distance from the center of the caster shaft 5 to a front wheel predicted contact surface 8c. Accordingly, the load applied on the heavy duty carriage 1 is directly transmitted to the rear wheels 6 or the front wheels 8, so that the caster shafts 5 are prevented from receiving excess load. Moreover, as illustrated in FIG. 7, the low-friction resin plate 11 is mounted between the carriage body lower part sliding surface 2e of the carriage body 2 and the sliding surface 4d of the caster body 4 to assist smooth rotation of the caster body 4. The outer diameter of the low-friction resin plate 11 is the same as that of the sliding surface 4d. In the first embodiment, "Y" is about 5 mm, the low-friction resin plate 11 is made of fluororesin, and the caster bodies 4 are interlocked with each other by using a gear system. However, the material and the method is merely an example, and the low-friction resin plate may be made of any other material or may be provided in any other method, and the gear may be any other type, such as a timing belt.

As illustrated in FIG. 7, the load receiving platform 3 has a gently sloped, truncated cone shape, from the outer circumference part to the center part. A load receiving platform shaft 3c underneath the center of the load receiving platform 3 is inserted into the platform shaft hole 2d of the carriage body 2, and a load receiving platform shaft hook 3b prevents the fall-off of the platform from the platform shaft hole 2d. The load receiving platform 3 is mounted on the carriage body 2 so as to be stretchable and shrinkable, and thus, the load receiving platform 3 can sink according to the load so as to contact closely to and be integrated with the top plate 2a with a suitable load, and the load receiving platform 3 is also rotatable in a horizontal direction. Moreover, a flexible anti-slip sheet 3a with a high friction coefficient is added on the top surface of the load receiving platform 3. In this case, the sinking amount is about 2 mm, and the suitable load is about 2 kg. However, the numerical value is merely an example, and each parameter may be larger or smaller.

Figure 5:
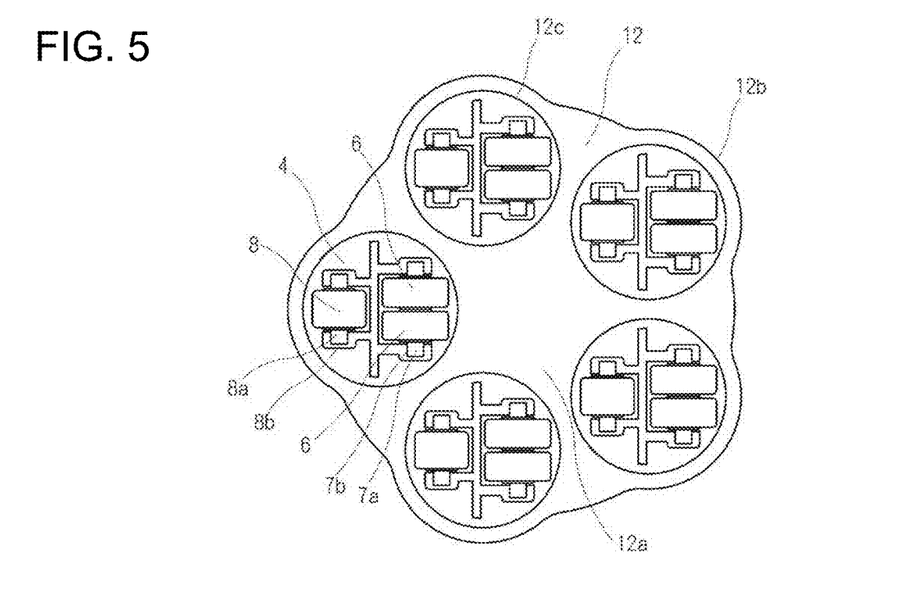
FIG. 5 is a bottom view illustrating the first embodiment according to the present disclosure.

As illustrated in FIGS. 3, 5, and 7, the bottom cover 12 has a curved exterior surface which partly covers the front and rear wheels from a lower surface 12a of the bottom cover to an external surface edge 12b of the bottom cover in a disk-like shape, and on the upper surface of the lower surface 12a of the bottom cover, reinforcement ribs 12c are provided, which also serve to prevent fall-off of the caster bodies 4 and the second external gear 9. The top of the bottom cover 12 is opened, and bottom cover locking hooks 13a are connected to the carriage body locking hook receivers 13 so that the bottom cover 12 is fastened to the carriage body 2.

Figure 9:
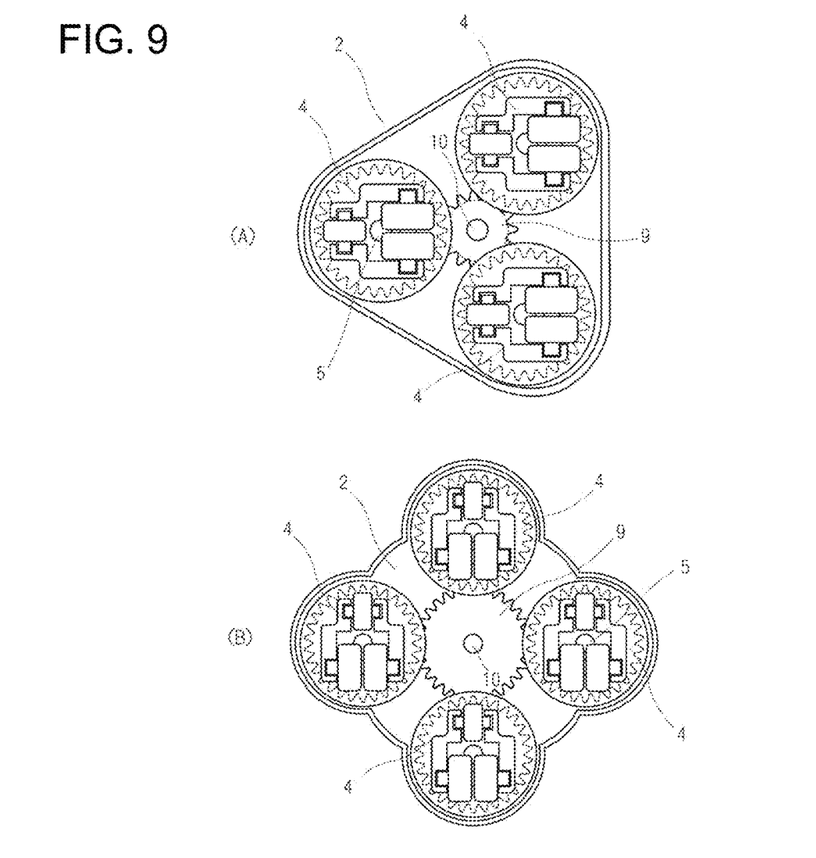
FIGS. 9(A) and 9(B) are open bottom views illustrating a second embodiment according to the present disclosure.
Figure 10:
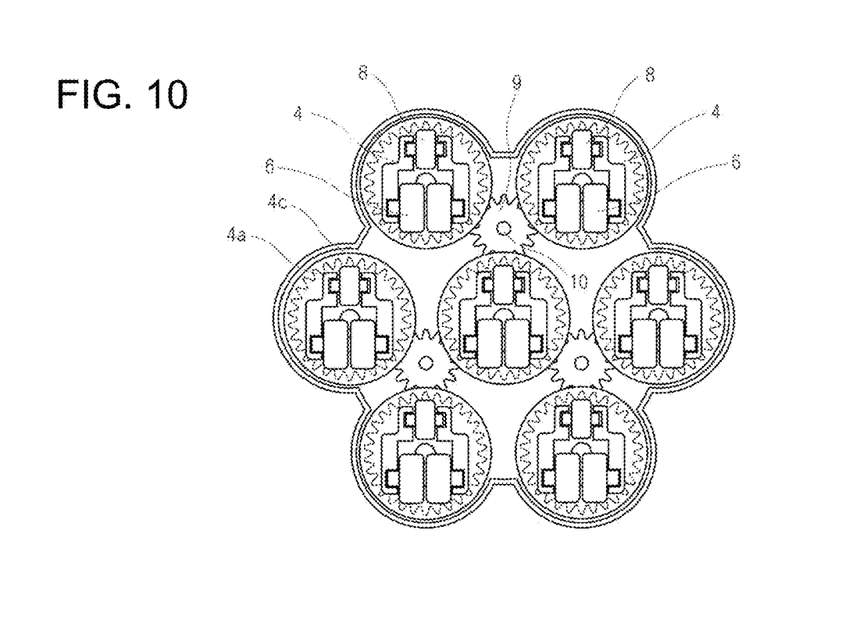
FIG. 10 is an open bottom view illustrating a third embodiment according to the present disclosure.

Although a carriage provided with five caster bodies 4 has been described above, three, or four or more caster bodies may be provided, as shown in FIGS. 9(A) and (B). Moreover, in the example illustrated in FIG. 10, seven caster bodies 4 are provided, based on the example with the combination of three caster bodies. In such a case, caster bodies can also be provided in the center part of the carriage, and thus, the carriage can achieve the higher load capacity.

Figure 11:
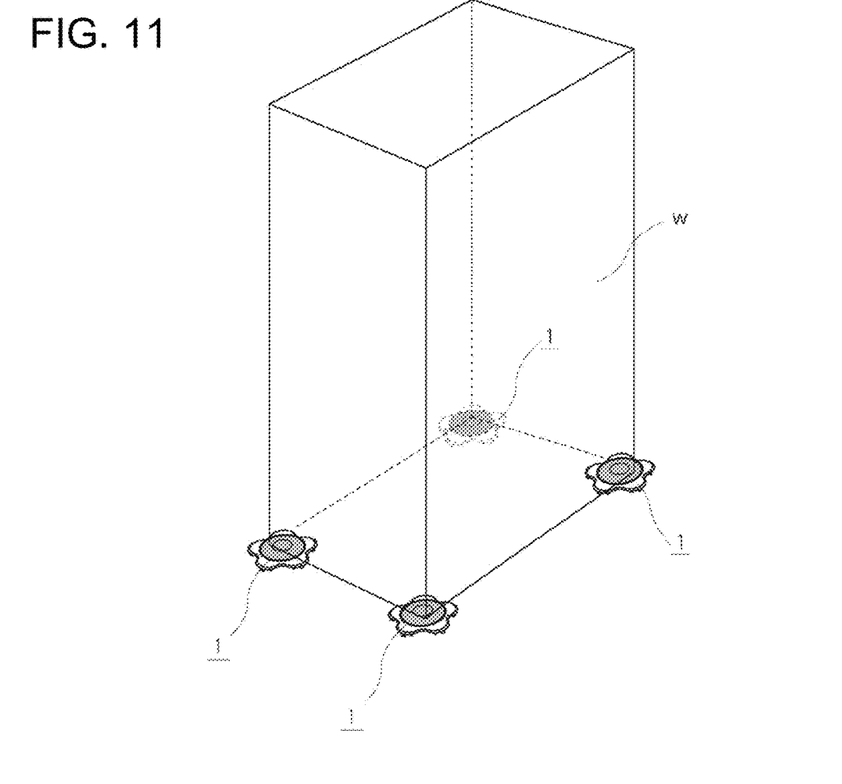
FIG. 11 is a view illustrating usage of the heavy duty carriage according to the present disclosure.
Figure 12:
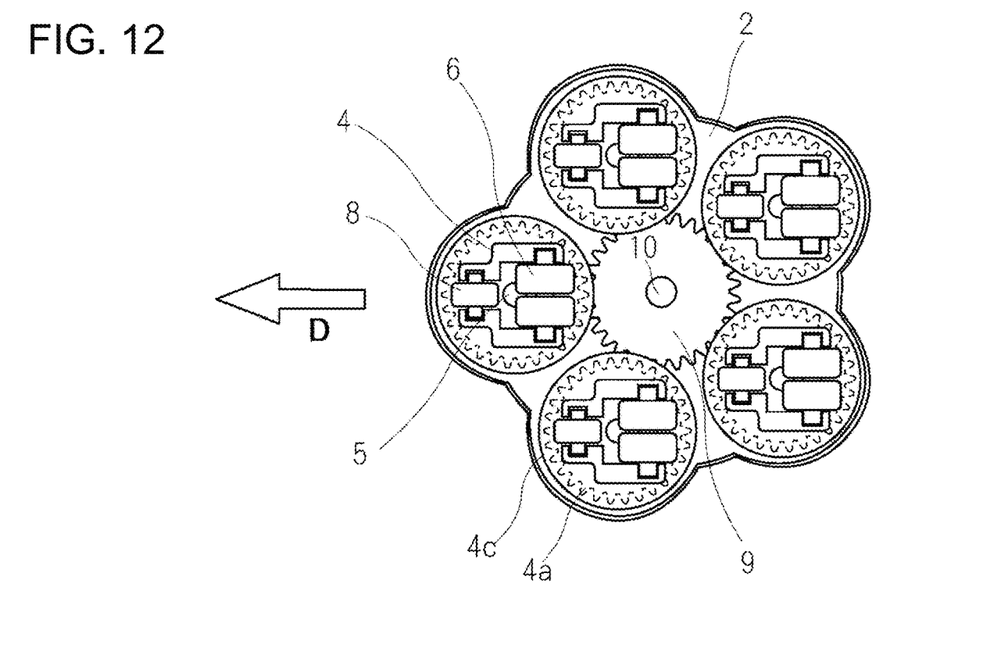
FIG. 12 is a view illustrating operation (#1) of the heavy duty carriage according to the present disclosure.
Figure 13:
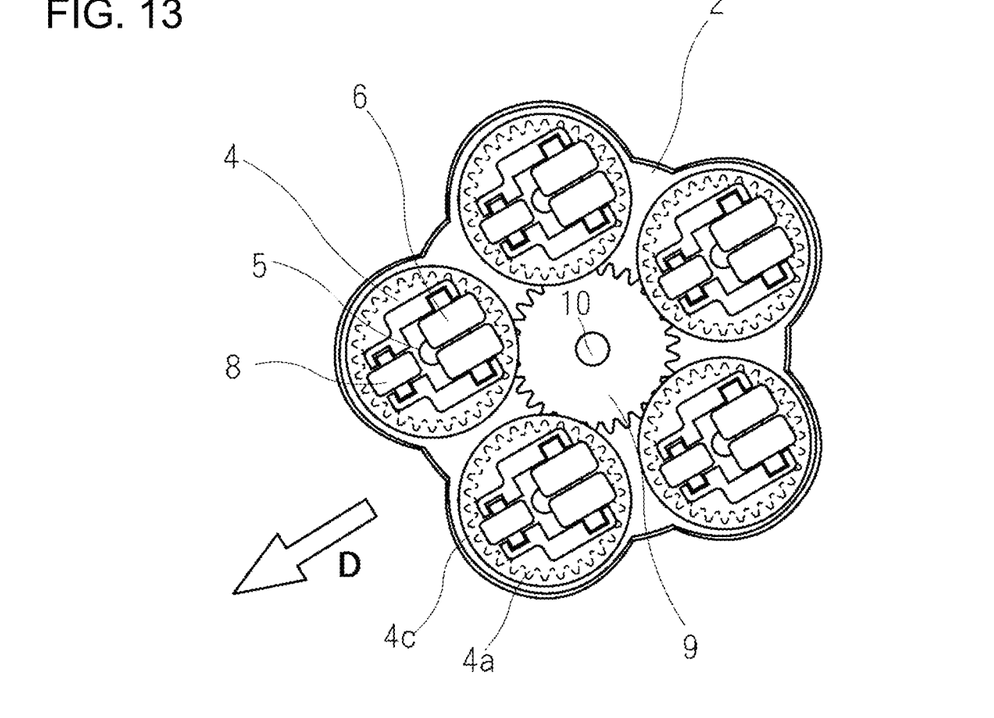
FIG. 13 is a view illustrating operation (#2) of the heavy duty carriage according to the present disclosure.

Hereinafter, with reference to FIGS. 1 to 23, the operation of the heavy duty carriage of the present disclosure will be described. As illustrated in FIG. 11, the heavy duty carriages 1 of the disclosure are placed in four corners underneath a heavy object W (e.g., a piece of furniture). Thus, the heavy duty carriages 1 can be integrated with, while supporting, the heavy object W, by utilizing the load applied from the heavy object W, and can move the heavy object W. As illustrated in FIG. 12, when the heavy object W is pushed or pulled in a moving direction, the rotating directions of the rear wheels 6 and the front wheels 8 of all of the caster bodies in the heavy duty carriages 1 are oriented to a traveling direction D of the heavy object W. Therefore, the heavy object W can be moved easily. Moreover, as illustrated in FIG. 13, even when the direction of pushing or pulling the heavy object W is changed, the caster bodies 4 rotate in the traveling direction D of the heavy object W and the rotational directions of the rear wheels 6 and the front wheels 8 are oriented to the traveling direction D of the heavy object W. Therefore, the heavy duty carriages 1 can easily move the heavy object W.

As illustrated in FIG. 6, the plurality of caster bodies 4 of the heavy duty carriage 1 according to the present disclosure are configured to interlock with each other via the second external gear 9, and thus, all caster bodies 4 are always oriented to the same traveling direction. Therefore, by placing the heavy duty carriages in four corners underneath the heavy object W (e.g., a piece of furniture), the carriages integrate with, while supporting, the heavy object W, by utilizing the load applied from the heavy object W, which allows the heavy object W to be moved easily.

Figure 14:
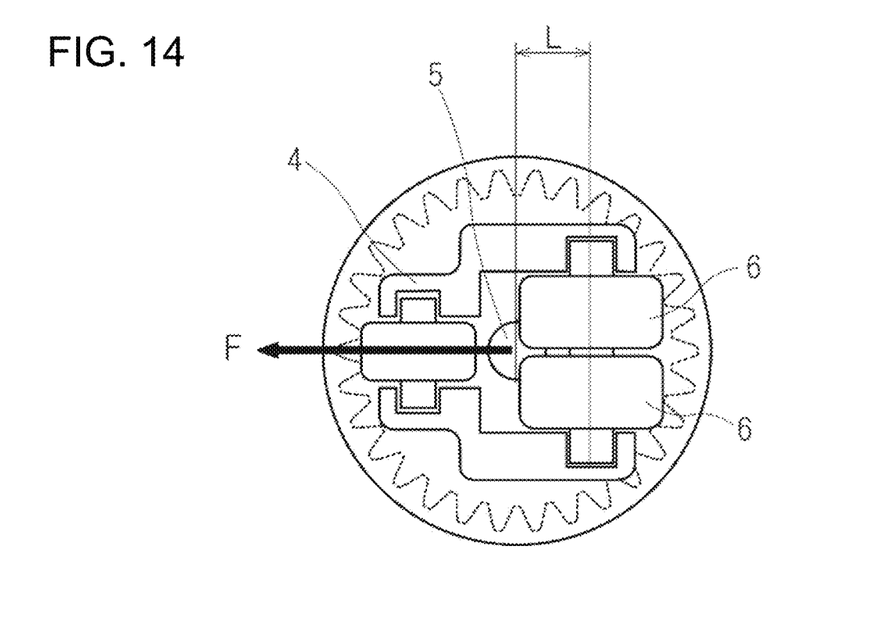
FIG. 14 is a view illustrating operation (#1) of the heavy duty carriage according to the present disclosure.
Figure 15:
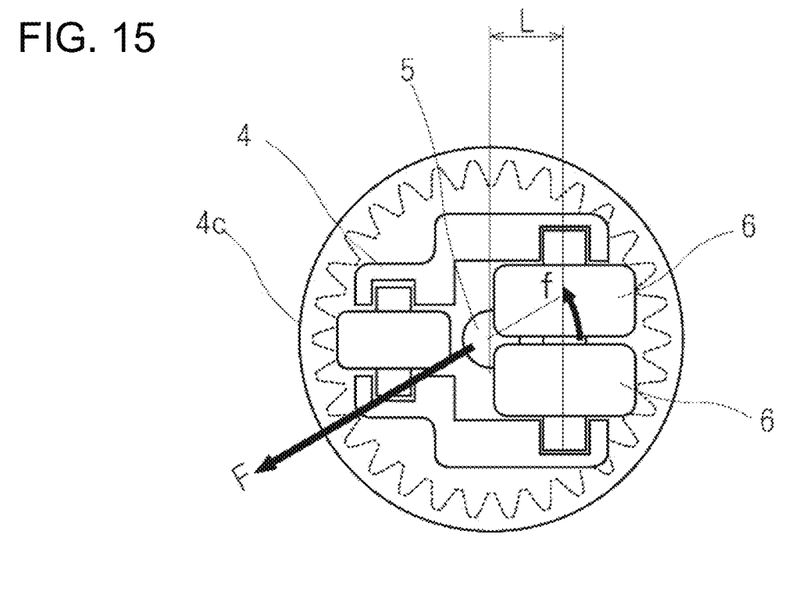
FIG. 15 is a view illustrating operation (#1) of the caster body according to the present disclosure.
Figure 16:
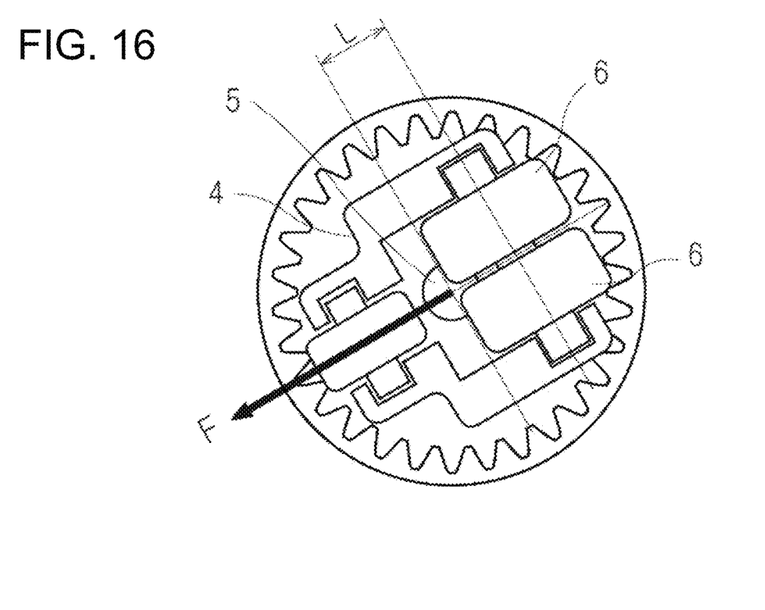
FIG. 16 is a view illustrating operation (#2) of the caster body according to the present disclosure.

As illustrated in FIGS. 14 to 16, in each caster body 4 of the heavy duty carriage 1 according to the present disclosure, the rear wheels 6 are positioned rearward of the caster shaft 5 and contact with the floor, while the front wheel 8 is positioned forward of the caster shaft 5 and does not contact with the floor, and the rear wheels 6 are rotatably supported to be spaced from the center of the caster shaft 5 by a distance L. Thus, as illustrated in FIG. 14, when the positions of the rear wheels 6 are rearward with respect to a traveling force F of the heavy duty carriage 1, the rear wheels 6 rotate while keeping such positioning, and thus, the heavy duty carriage 1 can easily travel. Moreover, the low-friction resin plate 11 is mounted between each caster body 4 and the carriage body around the caster shaft, to achieve a smooth rotation of the caster bodies 4.

FIG. 15 illustrates a case in which the traveling direction of the heavy object W is changed and the direction of the traveling force F of the heavy duty carriages 1 is changed. In such a case, a moving force f is generated to the rear wheels 6, toward the left of the drawing sheet with respect to the center of the caster shaft 5. Thus, as illustrated in FIG. 16, each caster body 4 rotates around the caster shaft 5, and the positions of the rear wheels 6 are changed to rearward of the traveling force F of the heavy duty carriage 1. Therefore, the heavy duty carriage 1 can easily travel.

Figure 17:
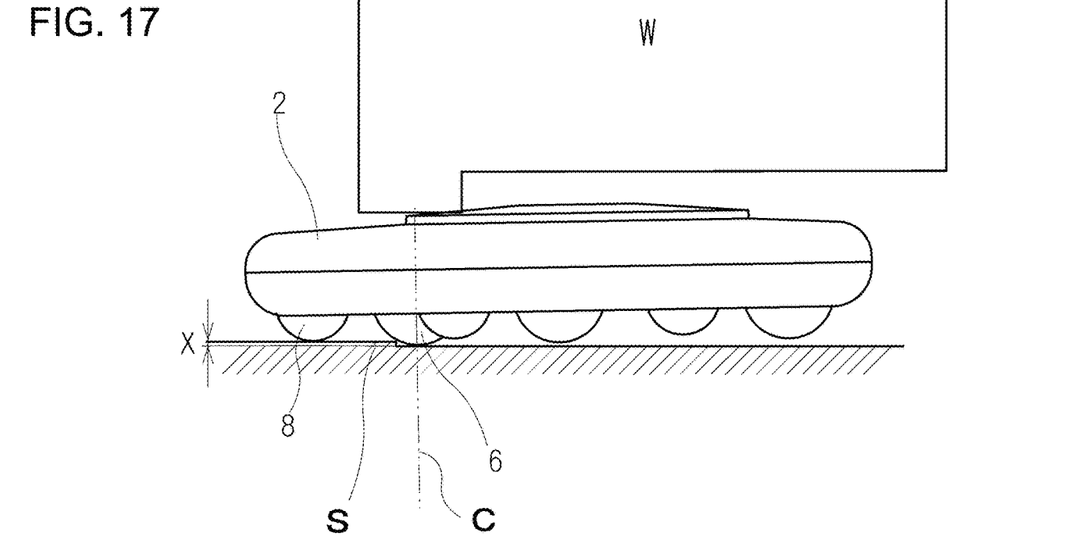
FIG. 17 is a view illustrating operation (#3) of the caster body according to the present disclosure.

Moreover, as illustrated in FIG. 17 as a particular example, when the heavy object W is moved while the load of the heavy object W (e.g., a piece of furniture), acts on the heavy duty carriage 1 only in its forward direction, if there is a step S, etc., the heavy duty carriage 1 tends to be inclined forward, because the forward traveling of the rear wheels 6 is prevented. However, according to the heavy duty carriage 1 of the present disclosure, since the front wheel 8 supports the load, such forward inclination of the heavy duty carriage 1 is prevented. Therefore, there is no possibility of the heavy object W falling off, and the user can operate more safely and easily.

Moreover, although the floor of houses or offices generally is not completely flat because of some bend, etc., the load receiving platform 3 of the heavy duty carriage 1 according to the present disclosure has the truncated cone shape gently inclining from the outer circumference part toward the center part, as illustrated in FIG. 7. The load receiving platform 3 sinks about 2 mm according to the load, and contacts closely and integrated with the top plate 2a with a load of about 2 kg. Thus, as illustrated in FIG. 11, when the heavy object W (e.g., a piece of furniture) is moved by placing the heavy duty carriages 1 in the four corners underneath the heavy object W, even if the floor surface below some of the heavy duty carriages 1 has a bend (e.g., sink), since the load receiving platform 3 stretches accordingly, the heavy duty carriages 1 do not come off the four corners underneath the heavy object W.

DESCRIPTION OF REFERENCE CHARACTERS

1 Heavy Duty Carriage of Present Disclosure
2 Carriage Body
2a Top Plate
2b External Surface Edge
2c Reinforcement Rib
2d Platform Shaft Hole
2e Carriage Body Lower Part Sliding Surface
3 Load Receiving Platform
3a Anti-slip
3b Load Receiving Platform Shaft Hook
3c Load Receiving Platform Shaft
4 Caster Body
4a First External Gear of Caster Body
4b Caster Body Bearing
4c Caster Body Rim
4d Caster Body Sliding Surface
4e Outer Circumferential Edge of Sliding Surface
5 Caster Shaft
6 Rear Wheel
6a Rear Wheel Contact Surface
7a Rear Wheel Shaft
7b Rear Wheel Bearing
8 Front Wheel
8a Front Wheel Shaft 8b Front Wheel Bearing
8c Front Wheel Predicted Contact Surface
9 Second External Gear
10 Second External Gear Shaft
11 Low-Friction Resin Plate
12 Bottom Cover
12a Lower Surface of Bottom Cover
12b External Surface Edge of Bottom Cover
12c Bottom Cover Rib
13 Carriage Body Locking Hook Receiver
13a Bottom Cover Locking Hook
W Heavy Object
F Traveling Force of Heavy Duty Carriage 1 Applied from Heavy Object
f Rotating Force of Caster Body 4
D Traveling Direction
S Step, etc.
C Center of Rear Wheel

The invention claimed is:

1. A heavy duty carriage, comprising:
a carriage body;
a load receiving platform mounted on a top of the carriage body; and
a plurality of caster bodies each rotatably supported by a caster shaft, the caster shaft being substantially perpendicular to a floor surface when the carriage body is placed on the floor surface,
wherein each of the plurality of caster bodies has a plurality of wheels rotatably supported by a lower part of the caster body, and a first external gear provided in an outer circumference of the caster body,
wherein the carriage body has, in a lower part thereof, a second external gear rotatably supported at a center of the carriage body by a second external gear shaft substantially perpendicular to the floor surface when the carriage body is placed on the floor surface,
wherein the plurality of caster bodies interlock with each other by meshing the first external gears with the second external gear, each of the first external gears of the plurality of caster bodies interlocking with the second external gear,
wherein each of the plurality of caster bodies has, on a top surface thereof, a sliding surface where the top surface of the caster body and a lower surface of the carriage body slide,
wherein, when the carriage body is placed on the floor surface and outer circumferences of the wheels contact the floor surface, contact surfaces of the outer circumferences of the wheels are positioned inward of a shape of an outer circumference of the sliding surface projected on the floor surface, and
wherein the carriage body, the caster shafts, and the second external gear shaft are integrally molded.

2. The heavy duty carriage of claim 1,
wherein each of the plurality of caster bodies has a caster body bearing,
wherein each of the plurality of caster bodies is provided with the first external gear in the outer circumference thereof, and wheel bearings on the lower surface thereof, and
wherein the sliding surface, the caster body bearing, the first external gear, and the wheel bearings are integrally molded.

3. The heavy duty carriage of claim 1, further comprising a bottom cover covering the lower surface of the carriage body and having openings where the plurality of caster bodies are exposed,
wherein the bottom cover also has a reinforcement rib configured to serve as a fall-off prevention of the plurality of caster bodies and the second external gear.

* * * * *